Jan. 9, 1951          B. W. KEESE          2,537,060
MOTOR VEHICLE DRIVING MECHANISM
Filed March 1, 1944          6 Sheets-Sheet 6
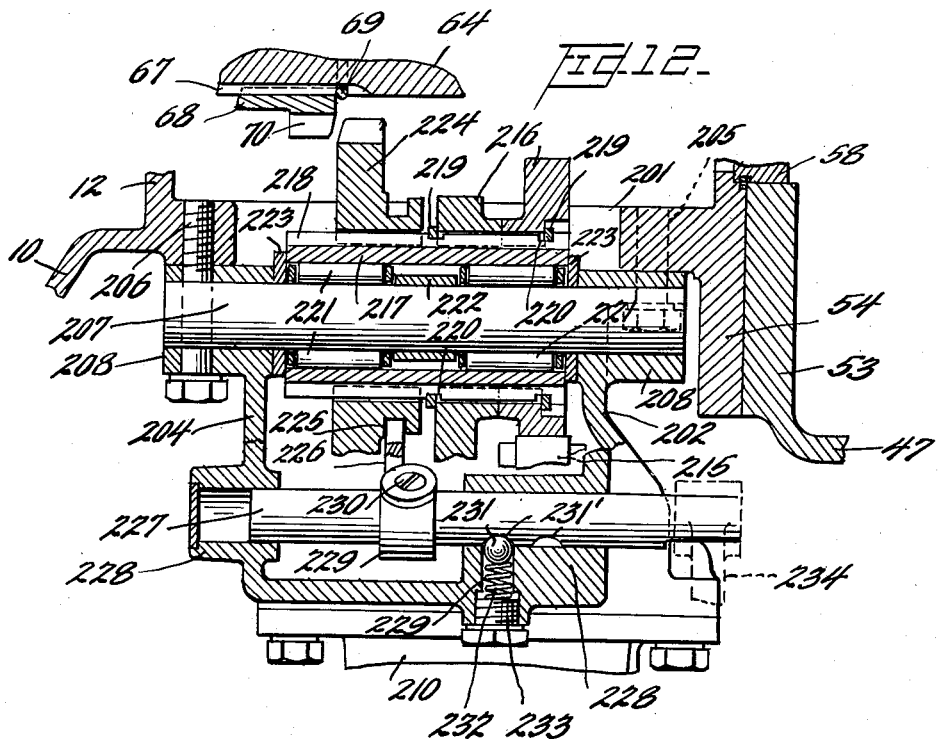
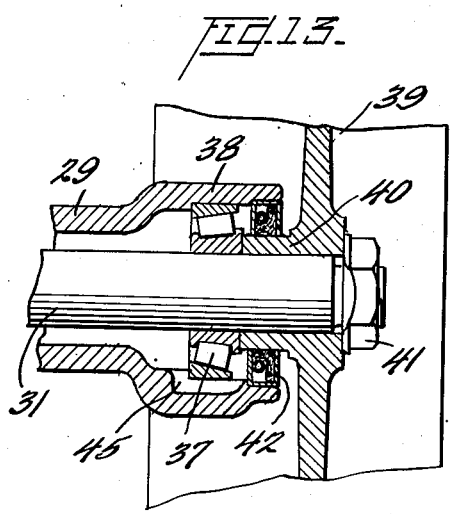
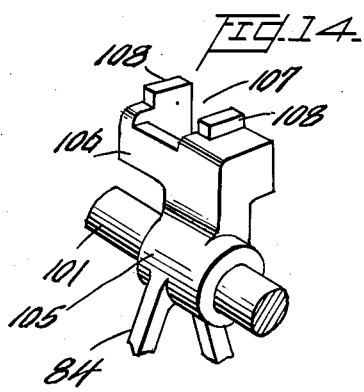
Inventor
Beverly W. Keese
By Strauch & Hoffman
Attorneys Patented Jan. 9, 1951

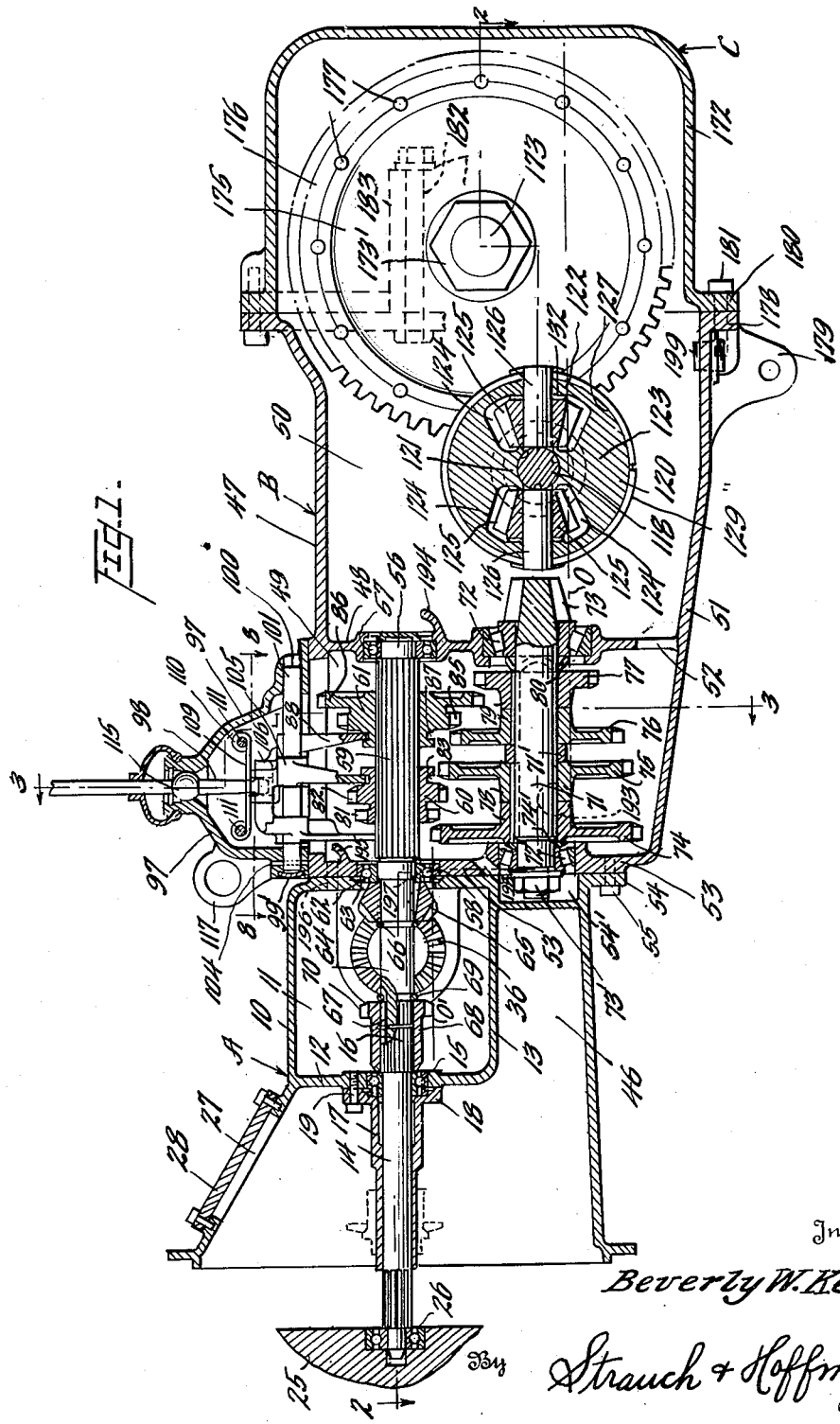

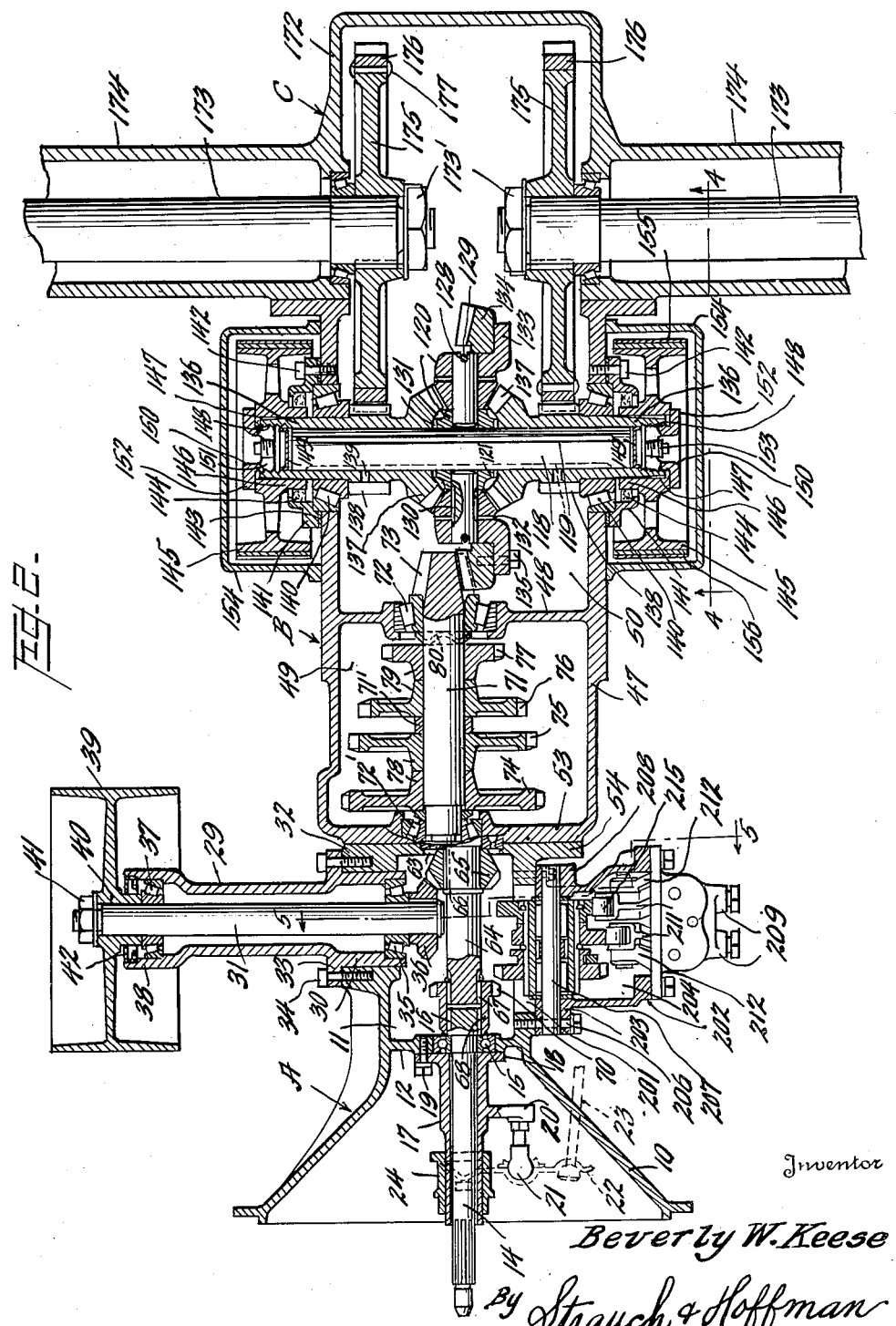

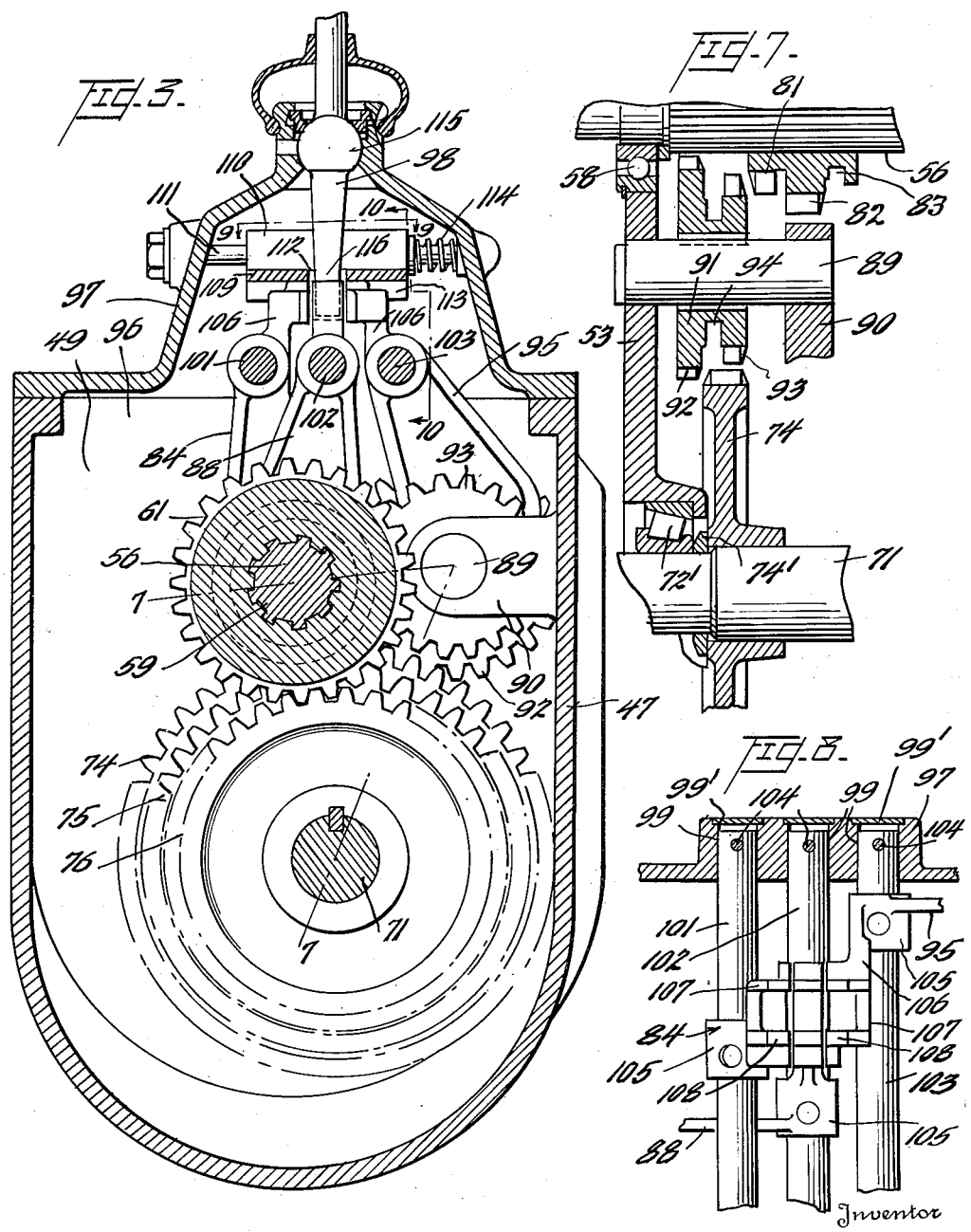

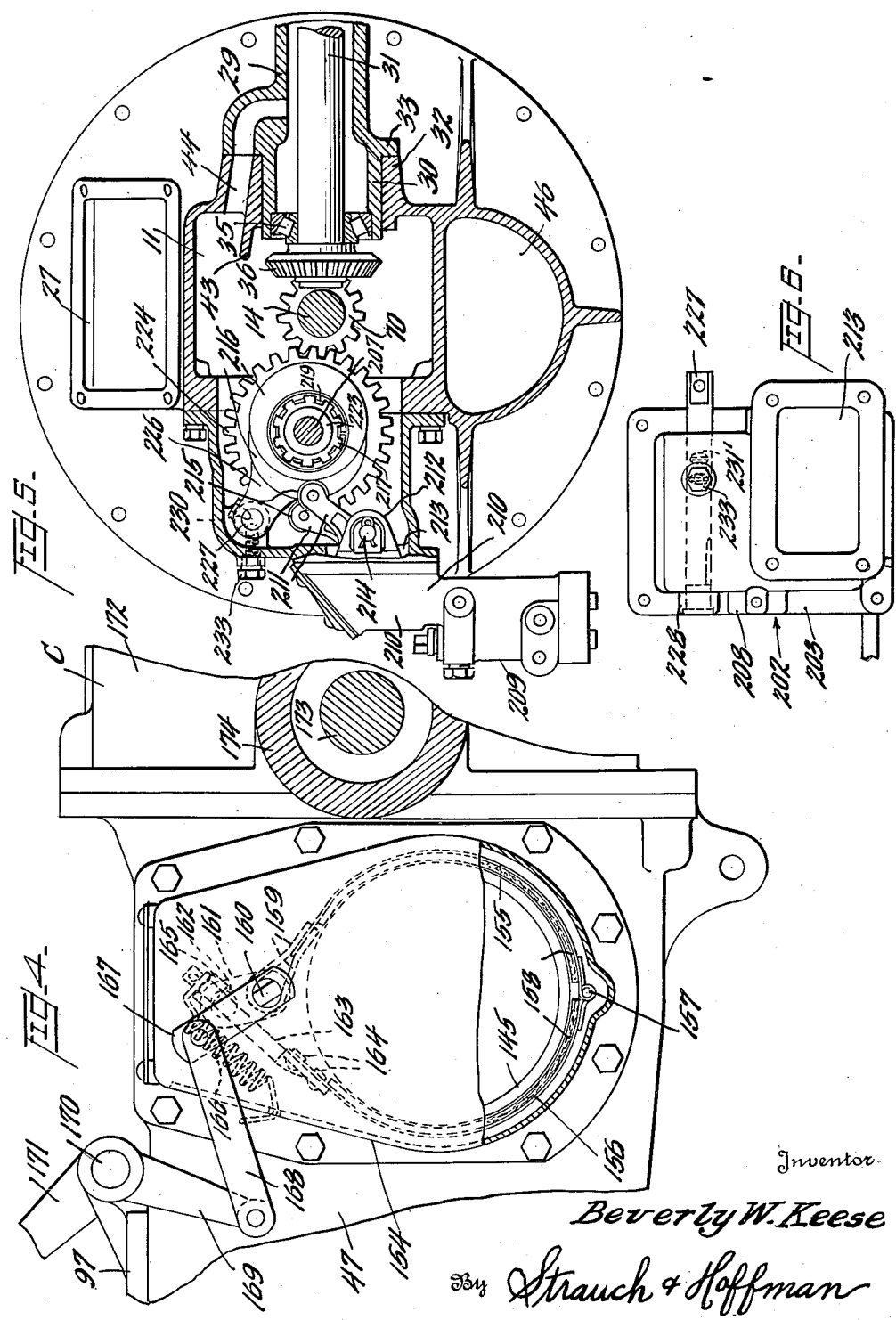

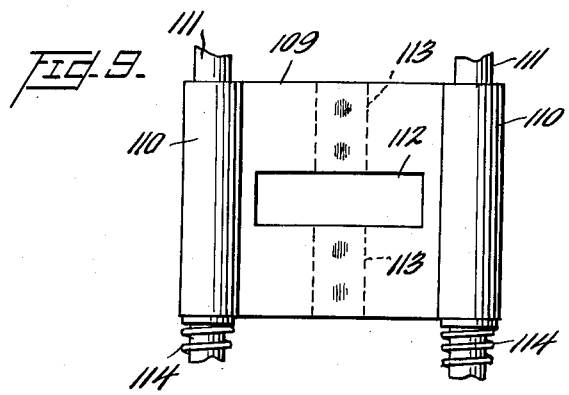
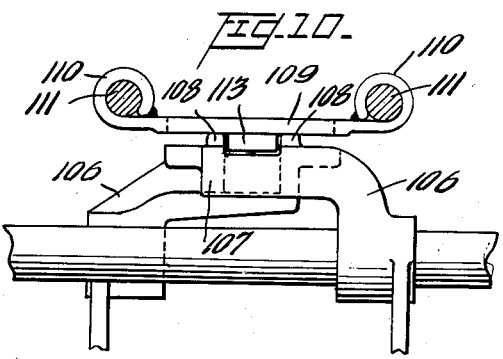
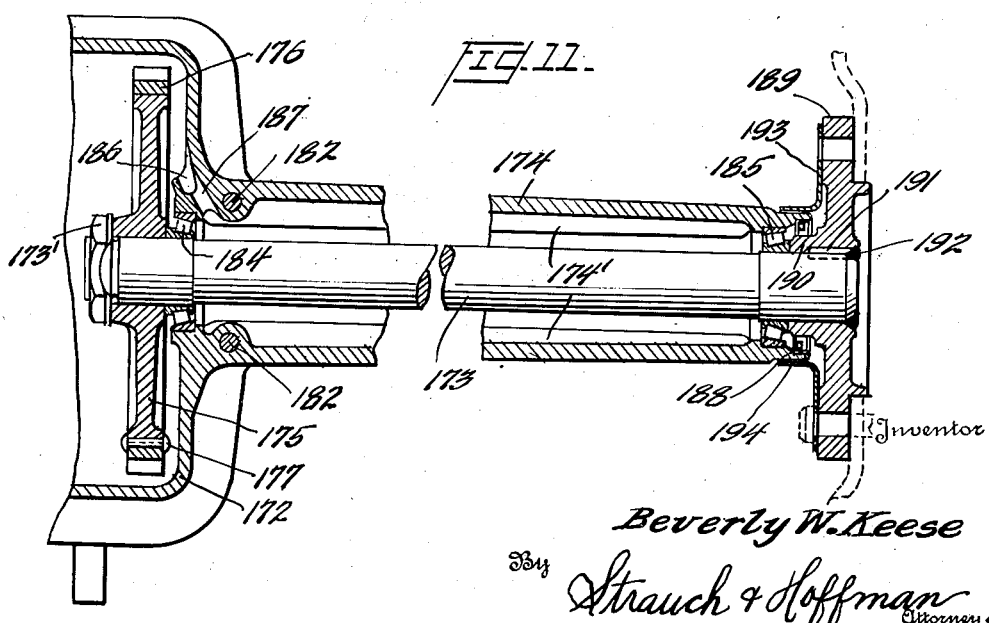

2,537,060

UNITED STATES PATENT OFFICE 2,537,060

MOTOR VEHICLE DRIVING MECHANISM

Beverly W. Keese, Oshkosh, Wis., assignor to The Timken-Detroit Axle Company, Detroit, Mich., a corporation of Ohio Application March 1, 1944, Serial No. 524,600

5 Claims. (Cl. 74—700)

This invention relates to motor vehicle driving mechanism and more particularly to driving mechanism for farm tractors and similar vehicles where the relative arrangement or location of the several driving units with respect to each other and the driven wheels of the vehicle is a factor of major importance in the efficient operation of the vehicle to economically and profitably accomplish the purposes for which the particular vehicle is designed.

Heretofore, in farm tractor design the engine and drive gearing, in some cases, was arranged at a comparatively high elevation above the wheel centers for clearance of the crop rows, plows and cultivating tools. The transmission and intermediate reduction gearing were above the wheel centers, while the final drive gearing was in the wheels. This arrangement has the objection of low power output to the driven wheels and consequently low operating speed of the vehicle.

In other suggested designs the power output shaft of the transmission was located below the wheel axle centers but the relative arrangement of the differential and speed reduction units and the driving connection with the transmission had the disadvantage of relatively high power losses, decreased operating efficiency and heavy maintenance expense resulting from severe mechanical stresses to which the relatively movable parts are necessarily subjected in a mechanism of this kind.

It is accordingly a major object of the present invention to eliminate the above noted serious objections to prior tractor drive designs and to provide a simple, rugged and compactly associated arrangement of the several power transmitting or driving units between the engine clutch shaft and the wheel axles of the vehicle. To this end I propose to arrange the differential and final gear reduction driving unit between the wheel axles, and the variable speed transmission unit with the output shaft axis of the latter unit and the differential major shaft axis preferably disposed in a common horizontal plane which is below the vehicle wheel axle centers. In this way a low center of gravity of the transmission and differential units is obtained, and, by eliminating the final drive gearing in the vehicle wheels, large diameter wheels may be employed to insure adequate implement and crop row clearance, as well as better traction.

Another object of my invention resides in the provision of a one-piece housing structure for the transmission and differential which may be conveniently installed as a single unit between the reduction gear housing and clutch and pulley drive gear housing, with means for uniting said housing structures to provide, in effect, a continuous, longitudinally rigid support for the several power transmitting and driving mechanisms.

A further object is to provide improved means for coupling the rear end of the clutch driven shaft to the forward end of the transmission power input shaft so that the latter shaft may be operatively mounted in only two bearings.

It is also an object of the invention to provide an improved differential construction and mounting, with direct driving connections between the differential side gears and final speed reducing gears on the respective wheel axles.

An additional object is to devise improved means for independently or simultaneously applying braking torque to the differential side gears and, in one embodiment thereof, to provide easily and quickly operable means for rigidly locking the brake drums in connected relation with said gears and simultaneously adjusting the differential shaft bearings.

A still further object of the invention resides in the provision of actuating means for an accessory unit, mounted on the pulley drive gear housing, and means for manually controlling the transmission of power to said actuating means from the coupling connection between the input shaft of the transmission and the clutch shaft.

Among other important objects of the invention reference may be made to an improved gear selector means for effectively locking the idle gears against axial movement on the power input shaft, and a common means for the adjustment of an end bearing for the transmission input shaft and for yieldably resisting axial movement of the variable speed and reverse gears in one direction along said shaft.

Further objects of the present invention will become apparent from the following description, when considered in connection with the accompanying drawings and the appended claims.

In the drawings, which illustrate one simple and practical embodiment of the invention:

Figure 1 is a sectional view in a vertical plane substantially on the longitudinal center line of the vehicle showing a preferred relative arrangement of the cooperative units of my vehicle driving mechanism;

Figure 2 is a horizontal sectional view taken substantially on the line 2—2 of Figure 1;

Figure 3 is a vertical transverse section taken substantially on the line 3—3 of Figure 1;

Figure 4 is a vertical sectional view taken substantially on the line 4—4 of Figure 2;

Figure 5 is a transverse sectional view taken substantially on the line 5—5 of Figure 2;

Figure 6 is a detail front elevation of the housing for an accessory operating unit;

Figure 7 is a detail sectional view taken substantially on the line 7—7 of Figure 3, illustrating the mounting of the reverse gear clutch;

Figure 8 is a fragmentary horizontal section taken on the line 8—8 of Figure 1;

Figure 9 is a horizontal section taken on the line 9—9 of Figure 3;

Figure 10 is a detail vertical section taken on the line 10—10 of Figure 3;

Figure 11 is a vertical sectional view through one side of the reduction gear housing and one of the axle casings, illustrating the mounting of the axle and one method of securing the wheel hub thereon;

Figure 12 is a detail horizontal section on an enlarged scale of the accessory operating means shown in Figure 2 and the gear shift mechanism therefor;

Figure 13 is an enlarged vertical sectional view of the outer end of the power take-off shaft housing; and Figure 14 is a detail fragmentary perspective view of one of the shifter forks of the gear selector mechanism.

Like reference characters indicate similar parts throughout the several views.

Referring to the drawings in greater detail, in the embodiment of my invention selected for purposes of illustration, the vehicle driving mechanism preferably comprises three primary units, viz., a clutch housing and power take-off unit A; a combined transmission and differential unit B; and the final drive or speed reduction and axle bearing unit C. By reason of this division of the mechanism into structurally independent units their assembly into an accurately co-related, cooperatively functioning power transmission system is greatly facilitated. These units will now be more specifically described in order.

The unit A embodies a bell housing section 10 for the clutch operating mechanism and a rear power take-off gear compartment 11 defined by forming the casting with vertical and horizontal partition walls 12 and 13, respectively, which are integral with the top, side and front end walls of the casting.

The driving mechanism to be later described is operatively connected with the power shaft of the engine or motor by the usual driven clutch shaft 14. The rear end of this shaft is rotatively supported by a suitable type of anti-friction bearing 15 mounted in the front wall 12 of the compartment 11 and projects for a short distance into said compartment. This projecting end of the shaft is formed with the splines 16 for a purpose which will be presently described.

The shaft 14 is further supported by a long bearing sleeve 17 having a flanged end 18 securely bolted to the front face of the wall 12, as indicated at 19. This sleeve is formed with the arm 20 extending radially from one side thereof, said arm being provided with a pivot stud 21 for the clutch throw-out lever 22. This lever when operated by the connecting rod 23 from the operator's clutch lever (not shown) actuates the clutch throw-out collar 24 slidably supported on the bearing sleeve 17.

The forward end of the shaft 14 is normally connected with the motor shaft by a suitable type of flywheel clutch, the shaft end being supported in the flywheel 25 by the pilot bearing 26. The top wall of the bell housing section 10 is provided with an opening 27 for convenient access to the clutch mechanism, said opening being normally closed by the cover plate 28.

One side wall of the compartment 11 is provided with an opening to receive the large diameter end section 30 of a load bearing casing 29 for the shaft 31, said casing and shaft extending from the side of the unit A at substantially right angles to the vehicle center line. Preferably, the opening through the wall of compartment 11 is defined by the boss 32 thereon, which affords extensive supporting contact for the end 30 of casing 29, and a flange 33 on the casing wall is securely bolted to said boss, as at 34.

The shaft 31 at its inner end is rotatably supported upon the part 30 of the shaft casing by a suitable type of anti-friction roller bearing 35, said shaft end, at the inner side of the bearing, having a bevel pinion 36 keyed or otherwise securely fixed thereto. At its outer end the shaft 31 is also supported in the anti-friction bearing 37 mounted in the enlarged outer end 38 of the casing 29. The shaft end projects beyond the casing and has a belt driving pulley 39 or other equivalent power transmitting element fixed thereto. The hub portion 40 of said pulley has contact at its inner end with the inner race of bearing 37 and by adjusting the nut 41 on the reduced threaded end of shaft 31 the bearings 35 and 37 are properly adjusted and pinion 36 positioned in compartment 11 for accurate mating engagement with the teeth of a driving pinion, as will be later described. The outer end of the part 38 of the shaft casing is closed by a conventional type of oil seal 42.

Above the bearing 35 the side wall of compartment 11 is formed with an internally projecting, upwardly inclined flange 43, providing a receiving trough for oil during operation of the gearing and by which such oil is directed by gravity through the downwardly inclined duct or passage 44 to the space between the shaft 31 and casing 29 at a point outwardly spaced from the casing attaching flange. One section of this duct is formed through the boss 32 and the other section thereof extends through an integral connection between the casing wall and attaching flange 33. The outer end 38 of the shaft casing is formed at its lower side with a relatively thick wall section having the internal duct or passage 45 opening at its ends into the casing on opposite sides of the bearing 37. In this manner an adequate supply of lubricating oil to the bearings 35 and 37 is assured.

At the lower side of gear compartment 11 the casting 10 of unit A is cored out as indicated at 46 to lighten the structure.

The unit B of the assembly includes a housing structure 47 for the variable speed transmission and differential mechanisms. This housing is preferably in the form of a one-piece casting internally divided by the vertical wall 48 into the transmission gearing compartment 49 and the differential gearing compartment 50. The bottom wall 51 of the housing structure is downwardly inclined from front to rear for the gravity flow of lubricating oil from compartment 49 into compartment 50 through the opening 52 in the lower end of wall 48.

The front end wall 53 of the housing structure 47 is adapted to be securely bolted to the rear end wall flange 54 of the clutch and power take-off housing structure 10, as shown at 55.

The power input shaft 56 of the transmission is rotatably supported at one of its ends by a conventional type of anti-friction bearing 57 mounted in the housing wall 48. Between this bearing and a similar supporting bearing 58 in the housing end wall 53 the input shaft is formed with longitudinally extending peripheral splines 59 to coact with complementary internal splines of the speed selector gear clusters 60 and 61, respectively, whereby the latter have unitary rotation with said shaft while being freely shiftable axially thereof, as will be presently explained. The bearing 58 abuts an annular shoulder 62 on the rear wall of the housing structure 10 and closes an opening 63 therein through which the front end section 64 of the input shaft 56 extends into the compartment 11 in axial alignment with the clutch shaft 14. The opening 63 accommodates the outer end of a bevel driving pinion 65, keyed or otherwise fixed to the shaft section 64 and held in abutting engagement with the inner race ring of bearing 58 by the snap ring 66 seated in an annular grove in said shaft at the inner end of the pinion. This pinion has driving engagement with the pinion 36 on the inner end of power-take-off shaft 31.

The forward end of the input shaft section 64 is also splined as at 67, said splines mating with the splines 16 on the rear end of the clutch shaft 14 for coaction with the internal splines of a coupling sleeve 68, whereby said shafts are connected for unitary rotation. One end of said sleeve abuts the inner race ring of clutch shaft bearing 15 and the other end thereof is engaged by the snap ring 69 seated in a groove in shaft section 64 to prevent longitudinal movement of the coupling sleeve. The latter end of said sleeve has a driving pinion 70 integrally formed therewith which drives actuating means for an hydraulic lift pump, as will be later described.

Below and slightly to one side of a vertical plane which includes the axis of the input shaft 56 the power output shaft 71 of the transmission is supported at its opposite ends upon housing walls 48 and 53 by anti-friction roller bearings 72 and 72', respectively, of well known type, the axis of said output shaft being substantially coincident with the longitudinal center line of the vehicle. Between said bearings the change speed gears 74, 75, 76 and 77 are keyed or otherwise securely fixed on the shaft 71, said gears transmitting first, second, third and fourth driving speeds, respectively, to the power output shaft 71 from the input shaft 56. Reverse rotation is also transmitted to said output shaft through the gear 74 in the manner to be presently explained. Preferably these gears are arranged in pairs, the gears in each pair having hub portions 78 and 79, respectively, laterally extending on one side of the plane of the respective gears for abutting contact with each other. Thus, the engaged hubs 78 of the first and second speed gears 74 and 75 prevent movement of said gears toward each other while the engaged hubs 79 of the third and fourth speed gears 76 and 77 serve a similar purpose with respect to the latter gears. The two pairs of gears are held in longitudinally spaced apart relation on the output shaft 71 by the spacing collar 71', surrounding said shaft between and in abutting contact with the hubs of the second and third speed gears 75 and 76, respectively.

Between the gear 77 and bearing 72 a crimped spring washer 80 surrounds the output shaft 71 and serves the double purpose of an adjusting means for the bearing and also to resist any tendency of the driven change-speed gears to move longitudinally in one direction along the output shaft.

At its opposite end the output shaft 71 has a reduced threaded portion to receive the adjusting nut 73' for the bearings. Between the inner side of bearing 72' and the hub of gear 74 a spacing washer 74' is interposed. The adjusting nut 73', when operated, finally adjusts the bearings 72 and 72' at both ends of the output shaft and is received in the recess or cavity 54' in the rear end wall of the housing structure 10 when the housing 47 is assembled therewith. The inner race ring of bearing 72 is engaged by one end of the bevel gear 73 integrally formed on the rear end of input shaft 71, and drives the differential mechanism in compartment 50, as will be later described.

The gear cluster 60 on the transmission input shaft 56 includes the integrally formed first and second speed gears 81 and 82, respectively, and grooved collar 83, receiving the arms of the shifting fork 84 by which the cluster 60 is shifted along the input shaft to selectively mesh the gears 81 and 82 thereof with the gears 74 and 75, respectively, on the output shaft 71. The other gear cluster 61 includes the integrally formed gears 85 and 86 and grooved collar 87 which receives the arms of shifting fork 88 by which the gear cluster is shifted to selectively mesh the gears 85 and 86 thereof with the gears 76 and 77, respectively, on the output shaft 71.

At one side of the input shaft 56 and slightly above the axis thereof a relatively short idler shaft 89 is suitably fixed at one end in the front end wall 53 of the transmission compartment 49 and at its other end in a bracket lug 90 formed on a side wall of said compartment. On this shaft the reverse gear cluster 91 is slidably and rotatably mounted. This cluster includes the integrally formed gear elements 92 and 93, respectively, and between said elements the annular groove 94 is formed to receive the arms of the shifting fork 95. Reverse rotation is transmitted to the output shaft 71 in the usual manner by shifting the gear cluster in one direction on the shaft 89 from its normal idle position to mesh the gears 92 and 93 thereof with gear 74 on the output shaft 71 and gear 81 on the input shaft 56, respectively.

The opening 96 in the top wall of the transmission compartment 49 is closed by a bonnet type cover casting 97 which houses the selector mechanism and upon which the usual shift lever 98 therefor is mounted. In the following detail description of this mechanism reference is made more particularly to Figures 1, 3, 8, 9, and 10 of drawings.

The base of the casting 97 is provided, at the front side thereof, with three horizontal openings 99 and at its rear side with three internally opening horizontal bores 100, in alignment with the respective openings 99. Shifter fork guide rods 101, 102 and 103 for the forks 84, 88 and 95, respectively, are supported at their opposite ends in these bores and openings of the casting 97, the latter end of each rod having a transverse opening, registering with a vertical opening in the casting base, to receive a pin 104 which locks the rod against rotative or longitudinal movement. Suitable closures 99' may be applied to the outer ends of the openings 99.

The rods 101, 102 and 103 are parallel to each other and to the input shaft 56 of the transmission. Each of the gear shifting forks is formed with a sleeve 105 at its upper end freely slidable on one of said guide rods. Each sleeve is provided at its upper side with a laterally off-set arm 106 having a vertically slotted or bifurcated end 107, the opposite sides of which are suitably spaced apart longitudinally of the guide rod to receive the lower end of the shift lever 98 therebetween. At each side of the slot the arm 106 is formed with an upwardly extending lug 108 for a purpose which will be presently explained.

Above the fork guiding rods the selector gate 109 is mounted in the bonnet casting 97. Preferably this gate is formed from a heavy metal stamping and comprises a rectangular plate having its opposite ends formed to provide parallel sleeves 110 slidably engaged on the rods 111, disposed at right angles to the fork guiding rods. Any suitable means may be employed for fixedly mounting the rods 111 at their ends in the opposite side walls of the casting 97. The selector gate is provided with an elongated slot 112 in parellel relation to the fork guiding rods and centrally thereof, and at each side, the metal locking ribs 113 are welded or otherwise secured to the lower face of the gate. These ribs extend from the slot 112 to the opposite side edges of the gate. Upon each of the rods 111 between one end of the sleeve 110 and the opposed wall of the casting 97 a spring 114 is interposed. These springs bias the selector gate 109 and lever 98 to a normal position and yieldingly resist movement of the gate and the lower end of shift lever 98 in one direction to connect said lever with the reverse gear shifting fork 88.

From the above description the operation of the gear selector mechanism may be readily understood. The shift lever 98 has the usual universal, ball-and-socket mounting in the upper end of the bonnet casting 97, as indicated at 115, and extends downwardly therefrom through the slot 112 in the selector gate 109. Below said gate the lower end 116 of the lever, in the normal upright position thereof, is disposed within the slotted end of the arm 106 of shifter fork 88 for the third and fourth speed gears, as seen in Figure 3. To shift into first or second speed the upper end of lever 98 is moved to the right and the lower end thereof, bearing against one side edge of the slot 112, moves selector gate 109 to the left on rods 111 and is connected with the slotted arm 106 of shifting fork 84, as shown in broken lines in Figure 3. In this movement of the selector gate one of the ribs 113 thereon is positioned between the lugs 108 on arms 106 of forks 88 and 95, thus locking the latter forks, which shift the third and fourth speed and reverse gears, against shifting movement. A rearward movement of the upper end of lever 98 will now shift the fork 84, sliding gear cluster 60 forwardly and connecting gear 81 thereof with gear 74 on the transmission output shaft for first speed drive. By moving the upper end of the lever forwardly said gears are disconnected and by continued movement of the lever gear 82 is then connected with the second speed gear 75 on the power output shaft. In these gear shifting movements of the lever its lower end moves longitudinally in slot 112 of the selector gate 109.

Upon shifting gear cluster 60 to a neutral position and returning lever 98 to an upright position the latter is again connected with fork 88. A rearward movement of said lever now shifts gear cluster 61 on the input shaft 56 to connect its gear 85 with gear 76 on the output shaft 71 for third speed drive, while a forward movement of said lever connects gear 86 with gear 77 for fourth speed drive. The forks 84 and 95 are locked against movement by the ribs 113 on the selector gate, respectively, positioned between the lugs 108 of the latter forks.

To reverse the rotation of transmission output shaft 71 the upper end of lever 98 (Figure 3) is first moved to the left. The selector gate 109 is thereby moved to the right against the resistance of springs 114 and the lower end of said lever is connected with the arm 106 of fork 95. A forward movement of the upper end of lever 98 now shifts reverse gear cluster 91 rearwardly, connecting gear 92 thereof with gear 74 on the output shaft 71 and gear 93 with gear 81 on the input shaft 56. Thus the direction of rotation of the power output shaft is reversed with respect to the input shaft of the transmission. In this position of the gear shift lever shifting forks 84 and 88 are respectively locked by one of the ribs 113 engaged between spaced lugs 108 of said forks.

If desired, the bonnet casting 97 may be provided with suitable externally formed bearing means 117 for the clutch and brake operating shafts.

The differential drive mechanism for the vehicle wheels is contained in housing compartment 50 of the unit B and includes a transversely positioned main shaft 118, preferably located with its axis disposed in a common horizontal plane with the axis of the transmission power output shaft 71. The shaft 118 has a plurality of longitudinally extending oil distributing grooves 119 formed in its periphery and a spider 120 is pressed upon the central portion of said shaft, the metal thereof interlocking in said grooves and establishing a securely fixed connection between the shaft and spider. The spider 120 has a hub portion 121, a rim portion 122 and a connecting web portion 123. The latter at diametrically opposite sides of the shaft 118 is provided with openings 124 therein to accommodate the bevel pinions 125 rotatably mounted upon radially disposed pins 126, the ends of which are engaged in aligned openings in the hub and rim portions of the spider. The peripheral face of the spider rim 122 is provided with an annular groove 127 and each of the pins 126 with a registering groove 128 in its outer end face to receive a locking ring 129, whereby said pins are held against rotative or longitudinal movement in the spider. The unloaded portion of each pin 126, at diametrically opposite points, has longitudinally flattened surfaces 130 spaced from the pinions 125 to provide oil circulating passages and the end faces of the spider hub 121 are provided with grooves 131 diametrically thereof for a similar purpose. Also grooves 132 in the spider rim connect with the passages formed by the flattened surfaces 130.

The spider rim 122, at one side thereof, has an integrally formed annular flange 133 to which the ring gear 134 is securely bolted, as at 135. The teeth of this ring gear are in meshed engagement with the teeth of the bevel gear 73 so that unitary rotation is transmitted from the power output shaft 71 to the spider 120 and pinions 125 thereon, in a vertical plane about the axis of the transverse shaft 118.

At each side of the spider 120 a sleeve 136 is loosely engaged upon the shaft 118 for rotation relative thereto. Each of these sleeves at its inner end has a bevel gear 137 integrally formed therewith, said gears respectively meshing with the pinions 125 at opposite sides thereof. Adjacent to each gear 137 elongated spur gear teeth 138 are formed on the periphery of the respective sleeves 136 for engagement with final drive gears on the vehicle wheel axles, as will be presently explained. Oil is supplied, through one or more radial openings 139 in the sleeves, to the grooves 119 in shaft 118.

Shaft 118 and sleeves 136 are rotatably supported on the opposite side walls of housing compartment 50 by the roller bearings 140. The inner race rings of these bearings have a driving fit on the respective sleeves and are engaged by the outer sides of the spur gears 138 thereon. At the outer side of each bearing 140 an annular member 141 is engaged with the outer bearing ring and secured to the housing wall by bolts 142. Between this member and the outer face of said wall, one or more bearing adjusting shims 143 are interposed.

Each member 141 is internally formed to receive an annular oil seal 144 of conventional type, which surrounds the inner end portion of the hub 146 of a brake drum 145 fixed upon the outer end of the respective sleeves 136. Each of said sleeves extends beyond the corresponding end of shaft 118 and is externally provided with longitudinally extending grooves or slots to receive the tapered splines 147 on the hub wall of drum 145. The projecting end of sleeve 136 is interiorly threaded as at 148 and inwardly thereof a plug 149 of rubber, cork or similar material is closely engaged with the sleeve wall and the end of the shaft 118 to tightly seal the end of the sleeve and prevent the leakage of oil.

The brake drum 145 is securely held against axial movement on the sleeve 136 by means of a metal plug 150 the body of which has a tapered threaded bore and is diametrically split, as at 151, said plug body being also externally threaded for engagement with the internal threads 148 of the sleeve 136. One end of the plug is formed with a flange 152 for abutting contact with the outer end of the drum hub 146. After the split plug 150 is threaded home, to move the brake drum inwardly on the sleeve end to the position determined by the tapered splines 147 and simultaneously draw the sleeve and gear 138 outwardly to adjust the bearing, a tapered locking screw 153 is then threaded into the bore of the plug. This screw expands the split portions of the plug body and tightly locks the same with the interiorly threaded end of the sleeve 136. Each brake drum 145 and the external brake mechanism cooperating therewith is enclosed within a housing 154 suitably secured to one of the side walls of the unit housing structure 47.

While any desired type of external brake applying mechanism might be employed, in Figure 4 of the drawings I have shown metal brake band sections 155 and 156 extending upwardly around opposite sides of drums 145 from the hinge or pivot connection 157 between their lower ends. Each of these metal band sections carries the usual brake lining material 158 on its inner face in opposed relation to the peripheral surface of the drum. At its upper end the metal band section 155 is connected by spaced metal straps 159 with the shaft 160 suitably journalled at its opposite ends in the walls of the housing structures 47 and 154. Between these straps a clevis member 161 is fixed to the shaft 160 and extends upwardly therefrom. The axis of shaft 160 is located in a vertical plane which intersects the axis of the brake drum 145 and in the upper ends of the spaced arms of the clevis 161 a pin 162 is loosely mounted at its opposite ends. This pin has a central opening diametrically therethrough receiving the upwardly extending rod 163 which is riveted, as at 164, to the upper end of the metal brake band section 156. The upper end of this rod is threaded and the nut 165 thereon has bearing contact with the pin 162. A biasing spring 166 has one of its ends connected with rod 163 above the nut 165 while its other end is suitably attached to one of the walls of housing 154.

Externally of the housing 154 an upwardly extending arm 167 is suitably fixed to the projecting end of the shaft 160. The upper end of this arm is pivotally connected by a link 168 to the arm 169 extending downwardly from the shaft 170 mounted on the base of the turret housing 97 for the gear selecting mechanism and operated by the brake pedal 171.

The spring 166 acts to normally retain the pin 162 in the position shown in Figure 4 with its axis spaced from one side of a vertical plane intersecting the axis of shaft 160 and with the liners 158 of the band sections 155 and 156 out of contact with the surface of the brake drum. When the brake pedal 171 is depressed the shaft 160 is rocked in a clockwise direction and pin 162 moved to a position on the opposite side of said vertical plane and spring 166 is stressed. Brake applying strain is thereby applied, through the rod 163, to the brake band sections and the liners 158 thereof are caused to engage and frictionally retard rotation of the drum 154 and the sleeve 136 and gear 137 connected to said drum. Preferably separate operating pedals are provided for the two brake mechanisms so that braking torque may be independently applied to the side gears of the differential as an aid in steering the vehicle.

The unit C of the assembly includes a housing 172 for the large speed reducing gears which are keyed or splined to the inner ends of the driving axles 173 for the respective traction wheels of the vehicle. Preferably, casings 174 for said axles are integrally formed with the opposite side walls of the housing 172. As herein shown, each of the reducing gears has a cast iron hub, web and rim portion 175 and a hardened ring gear 176 is shrunk on the peripheral face of the rim portion and securely fixed in position at the contacting faces of said rim and gear by a plurality of spaced rivets, as indicated at 177.

The rear end of the transmission and differential housing structure 47 is provided with a flange 178 and draw-bar lugs 179 on the bottom wall thereof. The flange 178 provides means for properly locating the flange 180 of housing 172 so that said housing will be accurately positioned for the reception of the reducing gears through the open end of the housing structure 47 in meshed engagement with the respective sleeve gears 138 of the differential. The mating flanges 178 and 180 are then securely connected by the bolts 181 and 182, the latter being relatively long and extending through bosses 183 formed on the axle casings 174.

Each wheel axle 173 is supported in the inner and outer ends of the casing 174 by anti-friction roller bearings 184 and 185, respectively. If desired the axle casings may be provided with upper and lower integral re-inforcing ribs 174'. Nuts 173' threaded on the inner ends of the axles and engaged with the hubs of gears 176 provide means for properly adjusting the bearings 184 and 185, suitable locking washers being associated with said nuts. It will be noted that each axle casing 174 is of progressively decreasing external and internal diameter from its inner to its outer end. Thus oil collecting in the pocket 186 on the side wall of housing 172 and draining into the axle casing through duct 187 will be supplied to the outer end axle bearing 185. Outwardly from said bearing the end of the axle casing is closed by an oil seal 188 which surrounds the inner sleeve extension 190 of the traction wheel hub 189. The inner wall of said sleeve and the periphery of the axle 173 are provided with a plurality of mating longitudinal grooves to receive the pins 191 which are permanently connected by the welds 192, applied over the outer ends of said pins, to the wheel hub and axle. The hub 189 is preferably provided with a metal apron 193 suitably secured to the inner face thereof and having a cylindrical portion 194 enclosing the outer end of the axle casing 174 to deflect dirt and prevent its entrance to the bearing 185. The metal wheel body, provided with the customary rim and traction lugs (not shown), is securely bolted to the outer face of the hub 189 in the usual manner.

Referring again to Figure 1 of the drawings, lubricating oil is supplied to the housing compartment 49 of unit B through the filler opening 193 and through opening 52 in the wall 48 to compartment 50, to maintain a normal oil bath level indicated by the line 0 on the transmission, differential and speed reduction gearing. A trough 194 formed on the wall 48, within compartment 50, serves to keep the oil level on the transmission gears more or less constant during the operation of the differential and speed reduction gearing, as oil collecting in this trough will drain back into the compartment 49 through the bearing 57. The front end wall of said compartment is also provided, above the power input shaft 56, with an oil collecting trough 195 from which oil is fed through registering openings 196 in said wall and the opposed wall of the housing 10 into the compartment 11 thereof containing the power take-off gearing. Additional registering openings 197 are formed through said walls to maintain the oil bath level 0' on said take-off gearing. Through the inclined duct 198 oil is supplied to the bearing 72' from the transmission gear compartment 49. At the rear lower end of the bottom wall of the housing structure 47, an oil drain opening is provided normally closed by the plug 199.

The side wall of gear compartment 11 of the primary unit A, opposite to the power take-off shaft 31, is provided with an opening 201 which receives actuating means for an accessory unit. This actuating means is carried by a casting 202 having an attaching flange 203 formed on one end of the housing 204 and secured to the wall of compartment 11 by bolts 205 and 206. The latter bolt is relatively long for engagement through an opening in one end of a shaft 207 and registering openings in opposite sides of one of the bearing bosses 208 formed on the flange 203 at each side of the housing 204. Thus the shaft 207 is securely fixed against axial or rotative movement relative to the casting 202.

In the present instance I have shown the accessory unit directly mounted on the outer end of the housing 202 though it will be evident that, by employing suitable power transmitting connections, said unit may be mounted or arranged in more or less remote relation to the primary unit A. For the purpose of illustration, in Figures 2, 5 and 6 of the drawings, I have shown this accessory unit as comprising a well known type of hydraulic pump to be used for lifting the tractor implements and other purposes. The pump cylinders, generally indicated at 209, are vertically positioned and integrally formed at their upper ends with a housing extension 210 for the plunger actuating bell cranks 211. The housing structure 210 is formed with spaced bearing lugs 212, extending through the opening 213 in the front wall of housing 202, between which the bell cranks 211 are fulcrumed upon the pin 214. One arm of each bell crank projects upwardly from pin 214 and is provided with a cam engaging roller 215.

The actuating means for the bell cranks 211 comprises a pair of reversely arranged cams 216, peripherally contacting the respective rollers 215 and secured on one end of a bearing race sleeve 217 for unitary rotation therewith by the splines 218 externally formed on said sleeve. The cams are locked against relative sliding movement on the sleeve, with their hub portions in abutting contact by the snap rings 219 seated in notches 220 formed in the edges of the splines 218. The sleeve 217 is supported on the fixed shaft 207 by two cage type roller bearings 221 spaced apart by the sleeve 222 on said shaft and a hardened thrust washer 223 surrounds the shaft 207 between each end of sleeve 217 and one of the shaft bearings 208.

With the other end portion of the sleeve 217 a driven gear 224 is connected by the splines 218 for sliding movement thereon and has a grooved collar 225 formed on one side thereof to receive the arms of a shifting fork 226, whereby said gear may be shifted into and out of meshed engagement with the driving pinion 70 of the coupling sleeve 68 for the clutch and transmission input shafts.

Any preferred means may be employed for manually shifting the fork 226, but for this purpose I have herein shown a rod 227, supported for axial movement in suitable bearings 228 formed on the opposite side walls of the housing 202. The fork 226 has an end hub 229 securely fixed on the rod 227 by a set screw 230. One of the bearings 228 is extended into the housing 202 and an opening 229 extends diametrically through one side of said bearing and the front wall of the housing. The rod 227 is formed on one side thereof with longitudinally spaced notches or seats 231' for a latching member 231 which is yieldingly urged into engagement with the seat by a spring 232 in opening 229. The outer end of this opening is closed by an adjusting screw 233 engaged with the outer end of spring 232 to regulate the pressure of latching member 231 on seat 231' as required. The rod 227 is extended beyond one side of the housing 202 and a manually operable member 234 is suitably connected thereto.

From the above it will be readily seen that by moving the slide rod 227 in one direction fork 226 shifts the gear 224 to the left (Figure 2) on the sleeve 217 into mesh with the teeth of pinion 70, thus establishing a more or less direct driving connection between the clutch shaft 14 and the actuating cams 216, with maximum transmission of power to the accessory unit. The coupling sleeve 68 constitutes a common driving connection between the clutch shaft 14 and the transmission input shaft and the accessory actuating mechanism. Of course, movement of rod 227 and fork 226 in the opposite direction shifts the gear 224 to its idle position, as shown in the drawing, and in both positions of said gear the shifting means is held against casual or unintentional operation by the latching means 231. The accessory actuating means and its supporting casting 202 may be easily and quickly mounted in operative position on the housing structure of unit A or removed therefrom, when its use is not desired, and the side opening 201 in said housing structure closed by means of a suitable cover plate, replacing said casting.

It is to be noted that the power take-off means and the accessory actuating means are mounted on opposite sides of the housing 10 and, therefore, are located in balanced relation on opposite sides of the vehicle center line.

The many advantages of my invention in practical tractor operation will be apparent to those familiar with the art. The arrangement of the transmission output shaft with its axis substantially coincident with the vehicle center line and in a common horizontal plane with the major shaft axis of the differential, and both of said shafts located a substantial distance below the wheel driving axles, results in a desirably low center of gravity, with increased stability of the organization as a whole, and minimum power transmission losses. Thus the potential driving energy of the motor will be applied in maximum degree to the final reducing gears directly fixed to the inner ends of the wheel axles. Also, by the removal of the final drive gearing from the wheels, large diameter wheels may be employed, resulting in better traction and the required clearance for crop rows and implements, notwithstanding the lowered center of gravity of the driving mechanism.

By coupling the extension of transmission input shaft 56, which operates the pulley drive gearing to the clutch shaft 14 by means of sleeve 68 closely adjacent to the clutch shaft bearing 15, the two bearings 57 and 58 provide adequate support for the pulley drive gear and the smooth transmission of power through the change-speed gearing to the power output shaft.

The selector mechanism above-described provides a simple and efficiently operating assembly of the gear shifting forks and operator's shift lever with means for automatically locking the unshifted gears in idle position. The spring washer 80, yieldingly resisting axial movement of the driven gears on the output shaft 71, serves to obviate possible damage to the intermeshing gear teeth and to minimize noisy metallic chatter in the gear shifting operation.

It will further be noted that the various mechanisms are completely housed within three housing sections of simple and rugged construction which may be inexpensively fabricated. The section which receives the final reduction gears also embodies the wheel axle casings in a single unitary structure. These housing sections are provided with means which insures a proper and adequate supply of lubricant to the movable parts of the several mechanisms.

The differential construction and the means which I provide for rigidly securing the brake drums in connected relation with the side gears thereof enables the several parts to be easily and quickly assembled and installed as an operative unit in the train of driving mechanism.

In general, my invention, as herein disclosed, provides a practical farm tractor in which, in a relatively simple mechanical organization, power is efficiently transmitted from the engine or prime mover to the wheel axles, and has many obvious advantages in the planting or harvesting of farm crops. In addition, the machine also embodies the other desirable features above referred to which materially increase its practical utility.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a motor vehicle driving mechanism, a housing having a front wall, an intermediate wall and a removable rear end wall, said intermediate wall dividing the housing into a forward transmission compartment and a rear compartment containing in longitudinal succession a differential and final drive gearing for the axles, a longitudinally disposed transmission input shaft in the upper part of said transmission compartment mounted in bearings in said front and intermediate walls, a second housing secured to said front wall and having a wall therein defining an internal compartment adjacent said front wall, an engine driven shaft projecting into said internal compartment in alignment with said transmission input shaft, said transmission input shaft projecting through said front wall into said internal compartment, means for drive coupling said shafts together within said internal compartment, a drive gear for a power take-off shaft rigid with one of said shafts in said second housing section, and a transmission output shaft in the lower part of said transmission compartment projecting through said intermediate wall into drive connection with said differential.

2. In the mechanism defined in claim 1, said transmission output shaft having its front end journalled in a bearing in said front wall and a passage in said front wall for supplying transmission lubricant to the front end of said bearing.

3. In motor vehicle driving mechanism, a housing having spaced apart walls forming a transmission compartment, transmission mechanism in said compartment including a transmission input shaft unsupported between said walls and anti-friction supporting bearing means for said shaft in each of said walls, an engine driven shaft, a power take-off drive gear housing forwardly of said transmission compartment, bearing means on said power take-off housing for said driven shaft, said transmission input shaft at one end extending exteriorly of said transmission compartment and into said power take-off housing, a power take-off shaft mounted on the power take-off housing, gearing drive-connecting the extended end of the transmission input shaft with said power take-off shaft, a coupling sleeve connecting the driven shaft adjacent to said bearing means in aligned power transmitting relation with said input shaft, an accessory drive gear on said coupling sleeve and means for detachably mounting the power take-off housing on the confronting end wall of said housing structure.

4. In motor vehicle driving mechanism, a housing section having a wall separating and defining transmission and differential compartments in longitudinal succession, transmission and differential gearing in the respective compartments, said transmission gearing including a power input shaft in the upper part of said transmission compartment having one end projecting longitudinally through the adjacent end of said housing section, a second housing section fixed to the latter end of said first housing section and having an internal wall defining a gear compartment receiving the projecting end of the transmission input shaft, an engine driven shaft projecting into said gear compartment, a sleeve in said gear compartment for coupling the driven shaft in axial alignment with the power input shaft, and a gear on said coupling sleeve.

5. In the mechanism defined in claim 4, a second gear mounted on said second housing section for rotation about an axis parallel to said engine driven shaft, and means for relatively shifting said gears into and out of mesh to drive said second gear directly from said engine driven shaft.

BEVERLY W. KEESE.

REFERENCES CITED

The following references are of record in the file of this patent:

UNITED STATES PATENTS

| Number | Name | Date |
|---|---|---|
| 1,347,690 | Ford | July 27, 1920 |
| 1,419,240 | Dunham | June 13, 1922 |
| 1,506,755 | Keim | Sept. 2, 1924 |
| 1,559,617 | Johnston | Nov. 3, 1925 |
| 1,559,629 | Leake | Nov. 3, 1925 |
| 1,611,402 | Baia | Dec. 21, 1926 |
| 1,734,375 | Hamilton | Nov. 5, 1929 |
| 1,849,144 | Hamilton | Mar. 15, 1932 |
| 1,852,126 | Moree | Apr. 5, 1932 |
| 1,887,351 | Hendrickson | Nov. 8, 1932 |
| 1,953,360 | Moree | Apr. 3, 1934 |
| 1,956,253 | Schoenrock | Apr. 24, 1934 |
| 1,982,436 | Johnston | Nov. 27, 1934 |
| 1,990,209 | Schoenrock | Feb. 5, 1935 |
| 2,015,108 | Harper | Sept. 24, 1935 |
| 2,022,762 | Ferguson | Dec. 3, 1935 |
| 2,084,887 | Bennett | June 22, 1937 |
| 2,103,543 | McCormick et al. | Dec. 28, 1937 |
| 2,214,805 | Baker et al. | Sept. 17, 1940 |
| 2,244,225 | Strehlow | June 3, 1941 |
| 2,245,078 | Padgett | June 10, 1941 |
| 2,276,000 | Stumpf | Mar. 10, 1942 |
| 2,317,070 | Le Tourneau | Apr. 20, 1943 |
| 2,317,957 | Frudden | Apr. 27, 1943 |
| 2,320,454 | Eberhard | June 1, 1943 |
| 2,323,384 | Eberhard | July 6, 1943 |

FOREIGN PATENTS

| Number | Country | Date |
|---|---|---|
| 469,373 | Germany | Dec. 10, 1928 |